No. 833,491. PATENTED OCT. 16, 1906.
W. THOMAS.
ADJUSTABLE RUNNING GEAR FOR WAGONS.
APPLICATION FILED AUG. 24, 1905.
2 SHEETS—SHEET 1.
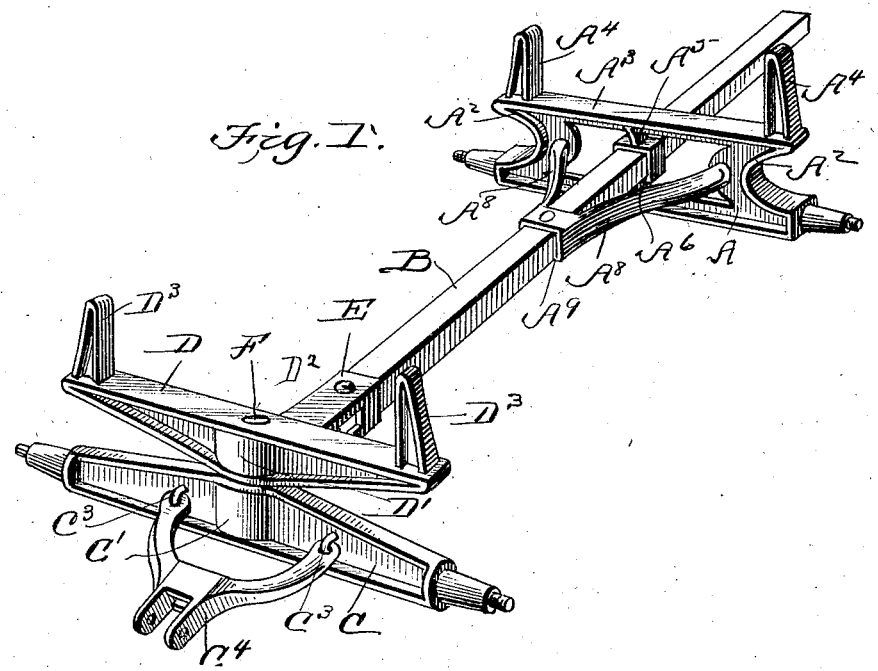
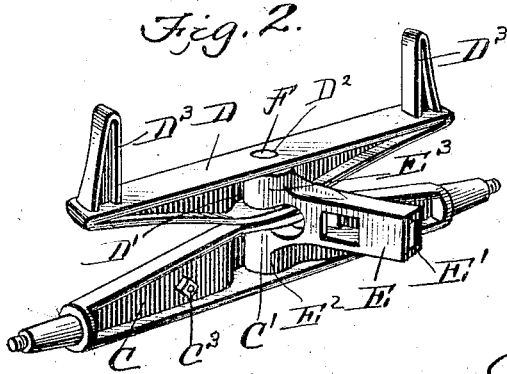
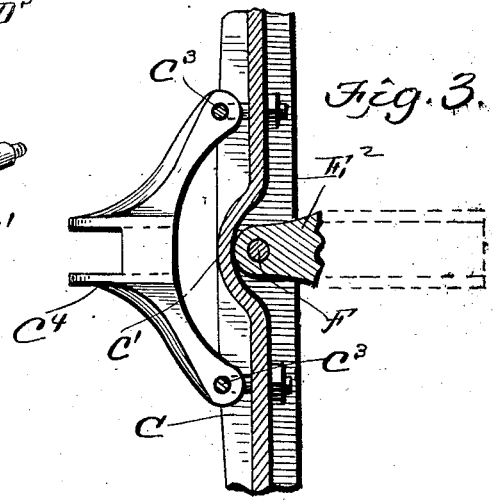
WITNESSES:
INVENTOR
W. Thomas.
BY
ATTORNEYS No. 833,491. PATENTED OCT. 16, 1906.
W. THOMAS.
ADJUSTABLE RUNNING GEAR FOR WAGONS.
APPLICATION FILED AUG. 24, 1905.
2 SHEETS—SHEET 2.
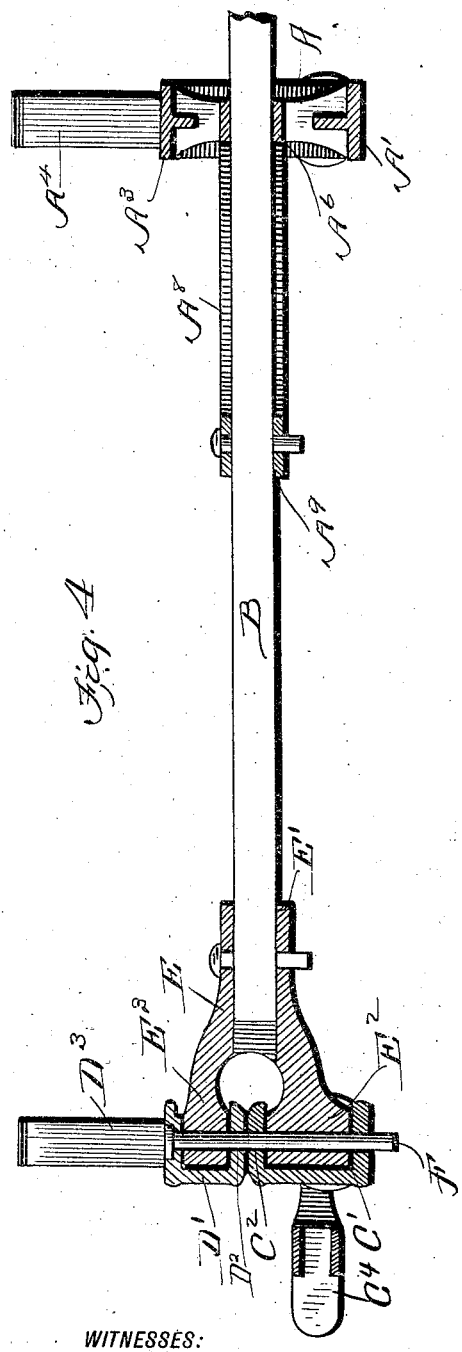
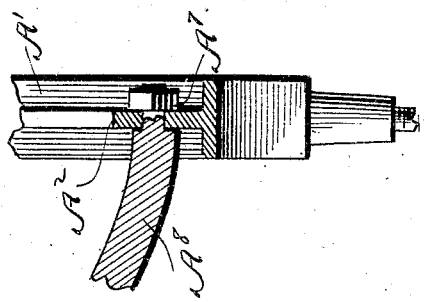
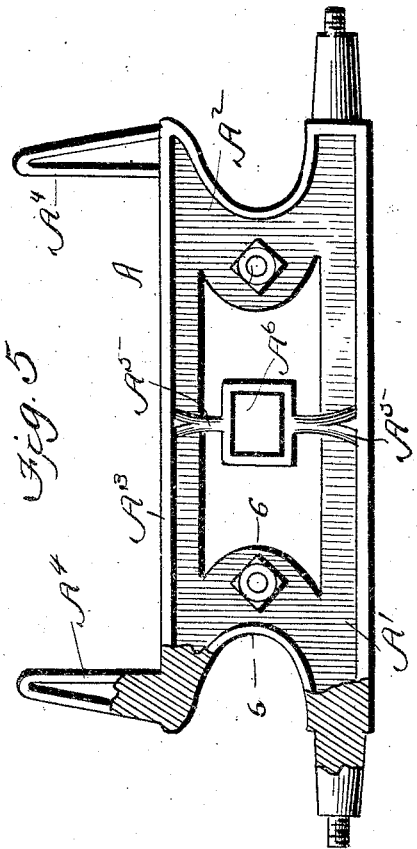
WITNESSES:
INVENTOR
W. Thomas.
BY
ATTORNEYS

UNITED STATES PATENT OFFICE.

WILLIAM THOMAS, OF SHEBOYGAN, WISCONSIN.

ADJUSTABLE RUNNING-GEAR FOR WAGONS.

No. 833,491.　　　　　Specification of Letters Patent.　　　Patented Oct. 16, 1906.

Application filed August 24, 1905. Serial No. 275,551.

*To all whom it may concern:*

Be it known that I, WILLIAM THOMAS, a citizen of the United States, residing at Sheboygan, in the county of Sheboygan and State of Wisconsin, have invented a new and useful Adjustable Running-Gear for Wagons, of which the following is a specification.

My invention relates to certain new and useful improvements in running-gears for vehicles, and has for its object to provide a running-gear that is very simple and cheap in construction and one that can be easily and quickly put together.

Another object of the invention is to provide a running-gear for vehicles with an improved reach-socket, so that the axle will be greatly strengthened where the reach is secured by the king-bolt.

A further object of my invention is to provide a bolster having stakes formed integral therewith, so that all danger of the stakes becoming loosened and coming off is prevented.

With these objects in view the invention consists in the novel features of construction, combination, and arrangement of parts hereinafter described, and pointed out in the claims.

In the drawings forming a part of this specification, Figure 1 is a perspective view of my improved running-gear. Fig. 2 is a perspective view of the front axle and bolster, showing the reach-socket in place. Fig. 3 is a detail view showing the reach-socket attached to the axle. Fig. 4 is a longitudinal section of the running-gear. Fig. 5 is a side elevation of the back axle and bolster, and Fig. 6 is a section taken on the line 6 6 of Fig. 5.

Referring to the drawings, A indicates the rear combined axle and bolster, which are formed integral and consist of the axle, A', proper, having the ordinary axle-skeins extending out from the end and is provided with curved uprights $A^2$, supporting the bolster $A^3$, having the ordinary standards $A^4$ at each end. Extending inwardly from the axle and bolster are braces $A^5$, carrying a square frame $A^6$, in which the reach-bar is adapted to fit. The uprights $A^2$ are provided with openings $A^7$, adapted to receive the end of the reach-supporting frame $A^8$, which is secured therein by nuts and is provided with a square opening $A^9$ at its other end, having an opening leading into it from the top, adapted to receive the pin, by which the reach-bar B is secured in the ordinary manner.

The front axle C is cast and is provided with the ordinary skeins and is formed with an enlarged hollow portion C', forming a reach-socket having openings $C^2$ formed in the top and bottom. Secured in openings formed on each side of the portion C' are eye-bolts $C^3$, carrying the tongue-coupling $C^4$.

Mounted on the axle is a bolster D, provided with an enlarged portion D', similar to the enlarged portion C' of the axle, having openings $D^2$ formed in the top and bottom and is provided with integral standards $D^3$ at its end.

The end of the reach-bar is secured by a pin in the opening E' of the coupling-head E, which is provided with perforated arms $E^2$ and $E^3$, one above the other, extending out from the socket and adapted to fit in the enlarged portions C' and D' of the axle and bolster and to be securely locked therein by the king-bolt F passing down through the bolster, arms, and axle, and securely lock the parts together.

From the foregoing description it will be seen that I have greatly improved the construction of the axles and bolsters and have provided an exceedingly strong reach-socket so constructed that all danger of it breaking is prevented.

Having thus fully described my invention, what I claim as new, and desire to secure by Letters Patent, is—

1. In a running-gear for vehicles, the combination with a rear axle having a bolster formed integral therewith, of a front axle and bolster provided with sockets, a coupling-head having spaced arms at one end and an opening at the other end, said arms adapted to be secured in the sockets of the front axle and bolster, and a reach-bar adapted to be secured in the opening of the coupling-head, and to the rear axle, for the purpose described.

2. In a running-gear for vehicles, the combination with a rear axle, having a bolster formed integral therewith, and provided with a reach-carrying frame, of the front axle provided with a reach-socket, the bolster mounted on said axle provided with a reach-socket, and a reach-bar fitting in the frame of the rear axle, a coupling-head having spaced arms at one end and an opening at the other, said arms adapted to fit in said sockets, of the front axle and bolster and a reach-bar secured in the opening of the coupling-head and to the rear axle, for the purpose described.

3. In a running-gear for vehicles, the combination with a rear axle, having a bolster formed integral therewith, standards formed integral with said bolster, of a front axle provided with a socket, openings formed in the top and bottom of said socket, a bolster mounted on said axle provided with integral standards, a socket formed in said bolster, provided with top and bottom openings, a hollow coupling-head having spaced integral arms adapted to be secured in said sockets, by a king-bolt and a reach-bar secured in said coupling-head and to the rear axle, for the purpose described.

4. In a running-gear for vehicles, the combination with a rear axle having a bolster formed integral therewith, a frame carried by said axle, of a front axle provided with a socket, a bolster provided with a socket mounted on said axle, a hollow coupling-head provided with perforated spaced integral arms adapted to fit in said sockets, and reach-bar secured in said coupling-head adapted to be adjustably connected to the frame carried by the rear axle, for the purpose described.

5. In a running-gear for vehicles, the combination with a reach-bar, of a coupling-head provided with an opening in which one end of said bar is secured, said coupling-head being provided with arms adapted to be secured in sockets formed in the front axle and bolster, by the king-bolt, and a rear axle carrying a frame provided with a pin adapted to engage the opening in the reach-bar and securely lock it to the same, for the purpose described.

WILLIAM THOMAS.

Witnesses:
 CHARLES HAPPERT,
 JOHN J. GOTTSACKER.